US008891925B2

(12) United States Patent
Bickham et al.

(10) Patent No.: US 8,891,925 B2
(45) Date of Patent: Nov. 18, 2014

(54) LOW BEND LOSS OPTICAL FIBER (75) Inventors: Scott Robertson Bickham, Corning, NY (US); Dana Craig Bookbinder, Corning, NY (US); Jeffrey Coon, Wilmington, NC (US); Ming-Jun Li, Horseheads, NY (US); Snigdharaj Kumar Mishra, Wilmington, NC (US); Pushkar Tandon, Painted Post, NY (US); James Andrew West, Painted Post, NY (US)

(73) Assignee: Corning Incorporated, Corning, NY (US)

(*) Notice: Subject to any disclaimer, the term of this patent is extended or adjusted under 35 U.S.C. 154(b) by 196 days.

(21) Appl. No.: 13/588,423

(22) Filed: Aug. 17, 2012

(65) Prior Publication Data
US 2013/0044987 A1 Feb. 21, 2013

Related U.S. Application Data (60) Provisional application No. 61/525,408, filed on Aug. 19, 2011, provisional application No. 61/601,713, filed on Feb. 22, 2012.

(51) Int. Cl.
*G02B 6/00* (2006.01)
*G02B 6/02* (2006.01)
*G02B 6/036* (2006.01)
*G02B 6/028* (2006.01)

(52) U.S. Cl.
CPC .......... *G02B 6/0281* (2013.01); *G02B 6/03627* (2013.01); *G02B 6/02014* (2013.01); *G02B 6/02266* (2013.01); *G02B 6/0365* (2013.01); *G02B 6/02242* (2013.01)
USPC ............................. 385/127; 385/142; 385/144

(58) Field of Classification Search
USPC ................................. 385/123–128, 141–145
See application file for complete search history.

(56) References Cited

U.S. PATENT DOCUMENTS

| 4,641,917 A | 2/1987 | Glodis et al. ............... 350/96.33 |
| 4,852,968 A | 8/1989 | Reed ........................... 350/96.33 |
| 5,056,888 A | 10/1991 | Messerly et al. .............. 385/123 |
| 5,721,800 A | 2/1998 | Kato et al. ..................... 385/127 |

(Continued)

FOREIGN PATENT DOCUMENTS

| EP | 1116969 A1 | 7/2001 |
| EP | 2175295 A1 | 4/2010 |

(Continued)

OTHER PUBLICATIONS

Patent Abstract of Japanese Publication #63-295358; Publication date: Dec. 1, 1988; Kazushige et al.

(Continued)

*Primary Examiner* — Akm Enayet Ullah
*Assistant Examiner* — Michael Mooney
(74) *Attorney, Agent, or Firm* — Robert L Carlson (57) ABSTRACT An optical fiber having both low macrobend loss and low microbend loss. The fiber has a first inner cladding region having an outer radius $r_2 > 8$ microns and refractive index $\Delta_2$ and a second outer cladding region surrounding the inner cladding region having refractive index $\Delta_4$, wherein $\Delta_1 > \Delta_4 > \Delta_2$. The difference between $\Delta_4$ and $\Delta_2$ is greater than 0.002 percent. The fiber exhibits a 22 m cable cutoff less than or equal to 1260 nm, and $r_1/r_2$ is greater or equal to 0.25.

31 Claims, 4 Drawing Sheets

(56) References Cited

U.S. PATENT DOCUMENTS

| | | | |
|---|---|---|---|
| 6,009,221 A | 12/1999 | Tsuda | 385/123 |
| 6,084,993 A * | 7/2000 | Mukasa | 385/24 |
| 6,116,055 A | 9/2000 | Ishikawa et al. | |
| 6,175,680 B1 | 1/2001 | Arai et al. | 385/127 |
| 6,233,001 B1 | 5/2001 | Sasaki | |
| 6,363,196 B1 | 3/2002 | Rousseau et al. | 385/127 |
| 6,625,362 B2 | 9/2003 | Inagaki et al. | 385/127 |
| 6,798,962 B2 | 9/2004 | Berkey et al. | |
| 6,823,125 B2 | 11/2004 | Koumura et al. | |
| 6,842,566 B2 | 1/2005 | Ishikawa et al. | 385/37 |
| 6,901,196 B2 | 5/2005 | Takahashi et al. | |
| 6,904,218 B2 | 6/2005 | Sun et al. | 385/127 |
| 6,999,667 B2 | 2/2006 | Jang et al. | 385/124 |
| 7,043,125 B2 | 5/2006 | Diep et al. | 385/123 |
| 7,164,835 B2 | 1/2007 | Matsuo et al. | 385/127 |
| 7,171,090 B2 | 1/2007 | Mattingly et al. | |
| 7,187,833 B2 | 3/2007 | Mishra | |
| 7,203,397 B2 | 4/2007 | Ouchi et al. | 385/28 |
| 7,239,784 B2 | 7/2007 | Hayami et al. | 385/123 |
| 7,366,387 B2 | 4/2008 | Matsuo et al. | 385/123 |
| 7,406,237 B2 | 7/2008 | Bickham et al. | |
| 7,440,663 B2 | 10/2008 | Matsuo et al. | 385/123 |
| 7,505,657 B2 | 3/2009 | Matsuo et al. | 385/123 |
| 7,526,168 B2 | 4/2009 | Matsuo et al. | 385/127 |
| 7,526,169 B2 | 4/2009 | Bickham et al. | 385/127 |
| 7,876,990 B1 | 1/2011 | Mishra | |
| 2002/0186941 A1 | 12/2002 | Hsu et al. | 385/123 |
| 2003/0016927 A1 | 1/2003 | Soufiane et al. | 385/127 |
| 2003/0190127 A1 | 10/2003 | Sillard et al. | 385/123 |
| 2003/0210878 A1 | 11/2003 | Kumano et al. | |
| 2003/0223716 A1 | 12/2003 | Christoff et al. | 385/124 |
| 2004/0114892 A1 | 6/2004 | Chiang et al. | 385/123 |
| 2005/0175303 A1 | 8/2005 | Jang et al. | 385/124 |
| 2005/0180709 A1 | 8/2005 | Park et al. | 385/124 |
| 2005/0185906 A1 | 8/2005 | Bickham et al. | 385/124 |
| 2006/0115224 A1 | 6/2006 | Kutami et al. | 385/123 |
| 2007/0189684 A1 | 8/2007 | Matsuo et al. | 385/123 |
| 2007/0189699 A1 | 8/2007 | Matsuo et al. | 385/142 |
| 2008/0101755 A1 | 5/2008 | Matsuo et al. | 385/127 |
| 2008/0273850 A1 | 11/2008 | Imamura | |
| 2011/0142404 A1 | 6/2011 | Zhang et al. | |

FOREIGN PATENT DOCUMENTS

| | | | |
|---|---|---|---|
| WO | 83/01517 A1 | 4/1983 | |
| WO | 02/21731 A2 | 3/2002 | |
| WO | 2007108764 | 4/2007 | G02B 6/036 |
| WO | 2009104724 | 8/2009 | G02B 6/036 |
| WO | 2011031612 A1 | 3/2011 | |
| WO | 2011147272 A1 | 12/2011 | |
| WO | 2012121923 A1 | 9/2012 | |

OTHER PUBLICATIONS

International Searching Authority, PCT Notification of Transmittal of the International Search Report and the Written Opinion of the International Searching Authority, Nov. 17, 2010.

* cited by examiner

LOW BEND LOSS OPTICAL FIBER

CROSS-REFERENCE TO RELATED APPLICATION

This application claims the benefit of priority under 35 U.S.C. §119 of U.S. Provisional Application Ser. No. 61/525,408 filed on Aug. 19, 2011 and 61/601,713 filed on Feb. 22, 2012, the contents of which are relied upon and incorporated herein by reference in its entirety.

FIELD

The present invention relates to optical fibers having low bend losses.

TECHNICAL BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals. transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some optical fiber designs to achieve both low bend loss and low cable cutoff wavelength at the same time.

SUMMARY

Disclosed herein are optical waveguide fibers comprising a central core region having outer radius $r_1$ and refractive index $\Delta_1$, a cladding region comprising a first inner cladding region having an outer radius $r_2>8$ microns and refractive index $\Delta_2$, and a second outer cladding region having refractive index $\Delta_4$, wherein $\Delta_1>\Delta_4>\Delta_2$, and the difference between $\Delta_4$ and $\Delta_2$ is greater than 0.002 percent and said fiber exhibits a MAC number>7.5. The fibers disclosed herein preferably exhibit a 22 m cable cutoff less than or equal to 1260 nm and in some embodiments $r_1/r_2$ is greater than or equal to 0.25, more preferably greater than 0.3, and even more preferably greater than 0.4. In some embodiments difference between $\Delta_4$ and $\Delta_2$ is greater than 0.005, and in some embodiments greater than 0.01 percent. In some embodiments, the difference between $\Delta_4$ and $\Delta_2$ is between 0.03 and 0.06, and in some embodiments the difference between $\Delta_4$ and $\Delta_2$ is between 0.07 and 0.1 percent. In the fibers disclosed herein, $\Delta_4$ is preferably greater than 0.0, more preferably greater than 0.01 and more preferably greater than 0.02.

Also disclosed herein are optical fibers comprising a central core region having outer radius $r_1$ and refractive index $\Delta_1$, a cladding region comprising a first inner cladding region having an outer radius $r_2>8$ microns and refractive index $\Delta_2$ and a second outer cladding region surrounding the inner cladding region and comprising refractive index $\Delta_4$, wherein $\Delta_1>\Delta_4>\Delta_2$, and wherein the difference between $\Delta_4$ and $\Delta_2$ is greater than 0.01 percent and the central core region of said fiber which substantially exhibits an alpha profile with an alpha less than 10, preferably less than 6, more preferably less than 4 and more preferably between 1 and 4.

Also disclosed herein are optical fibers comprising a central core region having outer radius $r_1$ and refractive index $\Delta_1$, a cladding region comprising a first inner cladding region having an outer radius $r_2>8$ microns and refractive index $\Delta_2$ and a second outer cladding region surrounding the inner cladding region and comprising refractive index $\Delta_4$, wherein $\Delta_1>\Delta_4>\Delta_2$, and wherein the core region comprises a refractive index profile which at least substantially follows a super-Gaussian profile, i.e. a profile which at least substantially follows the equation % $\Delta(r)=\% \Delta_{1max} \cdot EXP(-((r/a)^\gamma))$, where r is the radial distance from center of the fiber, a is a radial scaling parameter % $\Delta=((\% \Delta_{1max}/e)$, e is the base of the natural logarithm (~2.71828 . . . ), and γ (gamma) is a positive number. Preferably, a is greater than 4.0, more preferably greater than 4.6, and most preferably greater than 4.7.

Also disclosed herein are optical fibers comprising a central core region having outer radius $r_1$ and refractive index $\Delta_1$, a cladding region comprising a first inner cladding region having an outer radius $r_2>8$ microns and refractive index $\Delta_2$, wherein $\Delta_1>\Delta_2$, and wherein the core region comprises a refractive index profile which at least substantially follows a super-Gaussian profile, i.e. a profile which at least substantially follows the equation % $\Delta(r)=\% \Delta_{1max} \cdot EXP(-((r/a)^\gamma))$, where r is the radial distance from center of the fiber, a is a radial scaling parameter % $\Delta=(\% \Delta_{1max}/e)$ and wherein a is greater than 4.5, e is the base of the natural logarithm (~2.71828 . . . ), and γ (gamma) is a positive number.

The fiber designs disclosed herein result in fibers having optical properties that are G.652 compliant, MFD between 8.2 and 9.5 microns at 1310 nm, typically between 9.0 and 9.4 microns at 1310 nm, zero dispersion wavelength, λ0, of 1300≤λ0≤1324 nm, cable cutoff less than or equal to 1260 nm, and attenuation at 1550 nm≤0.189 dB/Km, more preferred ≤0.185 dB/Km, even more preferred ≤0.183 dB/Km at 1550 nm. Also disclosed are Super-Gaussian core profiles. The cladding region may be comprised of a depressed index surrounding the core. Fibers having this depressed cladding region have reduced microbending losses. The depressed index cladding region may have an index with respect to the outer cladding which is between −0.002 and −0.15% Δ, with the absolute volume of the depressed index cladding region being between about 0.3 and 80% Δ microns. The depressed index cladding region may be formed either by down doping the trench region (e.g. by fluorine doping or by doping with non-periodic voids) or by updoping the overclad. In other embodiments, the fibers may include both a depressed index cladding region and an outer cladding region which is updoped with respect to silica, i.e. a cladding region which includes an index increasing dopant such as germania or chlorine in sufficient amounts to appreciably raise the index of silica.

The fibers including super Gaussian profiles result in lower attenuation by 0.001 to 0.005 dB/km compared to comparable step index core profile germania-doped single mode (at 1550 nm) products. Lower attenuation will enable these fibers to reduce signal to noise ratio in the network. The super Gaussian profiles also result in lower macro- and microbending losses. Additional embodiments with a depressed cladding region allow new fiber designs with more control of dispersion properties.

Preferably, the fibers disclosed herein are capable of exhibiting a wire mesh covered drum microbend loss (i.e., an increase in attenuation from the unbent state) at 1550 nm which is less than or equal to 0.07 dB/km, more preferably less than or equal to 0.05 dB/km. Additionally, the fibers disclosed herein preferably exhibit a 20 mm diameter bend loss at 1550 nm which is not more than 0.75 dB/turn and 20 mm diameter bend loss at 1625 nm which is not more than 1.5 dB/turn. At the same time, these fibers are capable of providing an attenuation at 1550 nm which is less than or equal to 0.19 dB/km, more preferably less than 0.186 dB/km, and most preferably less than 0.184 dB/km, as well as an attenuation at 1310 nm which is less than or equal to 0.34 dB/km, more preferably less than 0.32 dB/km. Preferably, the 30 mm diameter bend loss at 1550 nm is not more than 0.025 dB/turn. In some preferred embodiments, the 20 mm diameter bend loss at 1550 nm is not more than 0.4 dB/turn. In other preferred embodiments, the 20 mm diameter bend loss at 1550 nm is not more than 0.3 dB/turn. In some preferred embodiments, the 30 mm diameter bend loss at 1550 nm is not more than 0.02 dB/turn. Such bend loss and attenuation performance numbers are attainable using a primary and secondary coating applied to the fiber, wherein the Young's modulus of the primary is less than 5, more preferably less than 1 MPa, and the Young's modulus of the secondary is greater than 500 MPa, more preferably greater than 900 MPa, and even more preferably greater than 1100 MPa.

In some embodiments, the refractive index profile further provides a zero dispersion wavelength of less than 1325 nm. In preferred embodiments, the refractive index profile further provides a zero dispersion wavelength of between 1300 and 1325 nm.

Preferably, the refractive index profile further provides a cabled cutoff of less than or equal to 1260 nm, more preferably between 1000 and 1260 nm.

In some preferred embodiments, the refractive index profile further provides a mode field diameter at 1310 nm between 8.2 and 9.5 micron. In other preferred embodiments, the refractive index profile further provides a mode field diameter at 1310 nm of between 8.2 and 9.0 micron.

As used herein, MAC number means mode field diameter at 1310 (nm) divided by 22 m cable cutoff wavelength (nm). In some preferred embodiments, the refractive index profile further provides a MAC number greater than 7.5. In some preferred embodiments, the refractive index profile further provides a MAC number of greater than 7.6 or greater than 7.77, or is at least 8.

Preferably, the optical fiber has a maximum hydrogen induced attenuation change of less than 0.03 dB/km at 1383 nm after being subjected to 0.01 atm partial pressure hydrogen for at least 144 hours. Preferably, the optical fiber has an optical attenuation at 1383 nm which is not more than 0.10 dB/km above an optical attenuation at 1310 nm, and even more preferably the optical attenuation at 1383 nm is less than the optical attenuation at 1310 nm.

Reference will now be made in detail to the present preferred embodiments, examples of which are illustrated in the accompanying drawings.

DETAILED DESCRIPTION OF THE PREFERRED EMBODIMENT

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and waveguide fiber radius. The radius for each segment of the refractive index profile is given by the abbreviations $r_1, r_2, r_3, r_4$, etc. and lower an upper case are used interchangeability herein (e.g., $r_1$ is equivalent to $R_1$).

The "relative refractive index percent" is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. The terms: delta, $\Delta$, $\Delta$ %, % $\Delta$, delta %, % delta and percent delta may be used interchangeability herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r\, dr)^2 / (\int f^4 r\, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, $2w = MFD$, and $w^2 = (2\int f^2 r\, dr/\int [df/dr]^2 r\, dr)$, the integral limits being 0 to $\infty$.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards.

Unless otherwise noted herein, optical properties (such as dispersion, dispersion slope, etc.) are reported for the LP01 mode.

Optical fibers disclosed herein are capable of exhibiting an effective area at 1550 nm which is greater than about 55 microns$^2$, preferably between 55 and 95 microns$^2$, even more preferably between about 65 and 85 microns$^2$. In some preferred embodiments, the optical mode effective area at 1550 nm is between about 75 and 90 micron.

Figure 1:
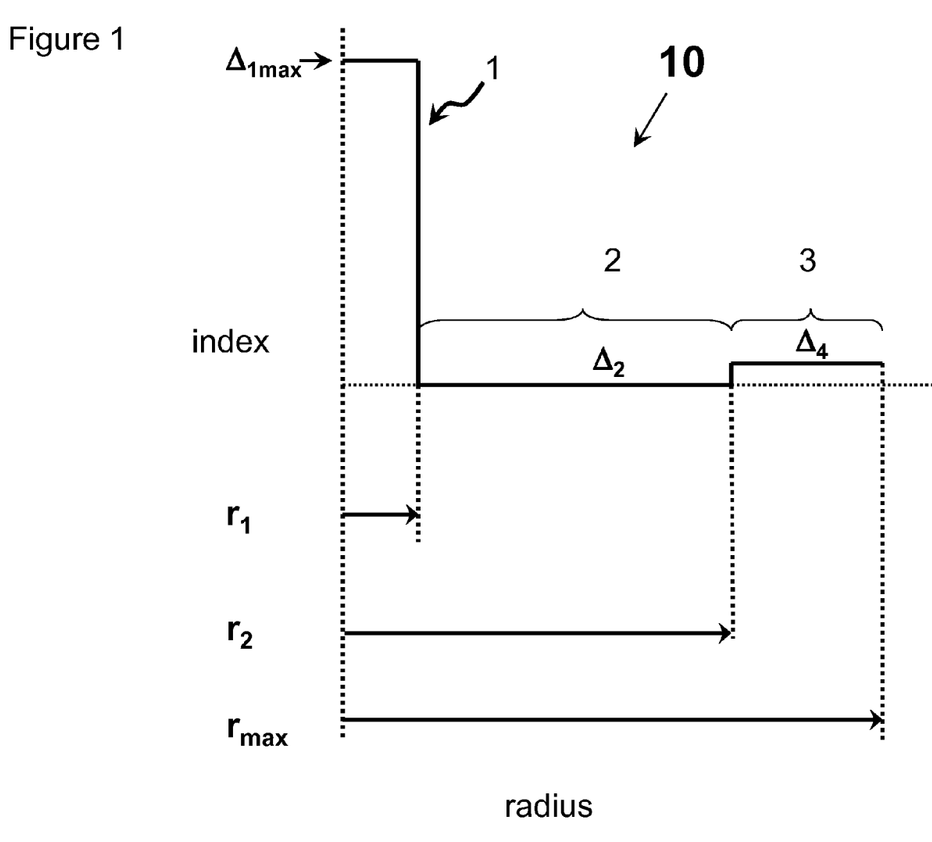
FIG. 1 shows a refractive index profile corresponding to an embodiment of an optical waveguide fiber as disclosed herein.

One exemplary fiber 10 is shown in FIG. 1, includes a central glass core region 1 comprising maximum refractive index delta percent $\Delta_1$. A first depressed inner cladding region 2 surrounds central core region 1, the first inner cladding region 2 comprising refractive index delta percent $\Delta_2$. Outer cladding region 3 surrounds first inner cladding region 2 and comprises $\Delta_4$. In preferred embodiments, $\Delta_1 > \Delta_4 > \Delta_2$. In the embodiment illustrated in FIG. 1, regions 1, 2, 3 are immediately adjacent one another. However, this is not required, and alternatively additional core or cladding regions may be employed. For example, an outer cladding region (not shown) may be employed which surrounds annular region 3 and comprises a lower refractive index delta percent $\Delta_4$ than annular region 3.

Central core region 1 comprises an outer radius $r_1$ which is defined as where a tangent line drawn through maximum slope of the refractive index of central core region 1 crosses the zero delta line. Core region 1 preferably exhibits a refractive index delta percent, $\Delta_1$, between about 0.3 to 0.7, and in some embodiments between about 0.3 to 0.5, more preferably between about 0.32 to 0.48. In some embodiments, $\Delta_1$ is preferably between 0.36 to 0.46. In some embodiments, $\Delta_1$ is preferably less than 0.4. Core radius $r_1$ is preferably between 3 and 10 microns, more preferably between about 4.0 to 7.0 microns. Central core region 1 may comprise a single segment, step index profile. In some embodiments, central core region 1 exhibits an alpha greater than 0.5 and less than 10, and in some embodiments less than 7.5, less than 6, or less than 4. However, in other embodiments, central core region 1 may comprise an alpha between about 10-100, and in some cases alpha may be between 15 and 40. In some preferred embodiments, central core region 1 exhibits an alpha greater than 0.5 and less than 10, and in some embodiments less than 7.5, less than 5, or less than 3, and a core region 1 having a refractive index delta percent, $\Delta_1$ between 0.38 to 0.48. In some preferred embodiments, central core region 1 substantially exhibits an alpha profile with an alpha greater than 0.5 and less than 10, and in some embodiments less than 7.5, less than 5, less than 3, or greater than 1 and less than 3, and a core region 1 having a refractive index delta percent, $\Delta_1$ between 0.38 to 0.70, and a core radius between about 4 to 7 microns. In some preferred embodiments, central core region 1 substantially exhibits an alpha profile with an alpha greater than or equal to 1.5 and less than or equal to 3.5 and a core region 1 having a refractive index delta percent, $\Delta_1$ between 0.38 to 0.70, and a core radius between about 4 to 7 microns.

In the embodiment illustrated in FIG. 1, inner cladding region 2 surrounds central core region 1 and comprises inner radius $r_1$ and outer radius $r_2$, $r_1$ being defined as above and $r_2$ being defined as where the refractive index profile curve crosses the zero delta line. In some cases the refractive index in region 2 is essentially flat, in some embodiments region 2 increases in refractive index as radius increases. Still in other cases there can be fluctuations as a result of small profile design or process variations. In some embodiments, the first inner cladding region contains less than 0.02 wt % fluorine. In some embodiments, the inner cladding region 2 comprises silica which is substantially undoped with either fluorine or germania, i.e., such that the region is essentially free of fluorine and germania. Inner cladding region 2 comprises refractive index delta percent $\Delta_2$ which is calculated using:

$$\Delta_2 = \int_{r1}^{r2} \Delta(r)\,dr / (r_2 - r_1)$$

The inner cladding region 2 preferably exhibits a width between about 3 to 13 microns, more preferably 4 to 12 microns, even more preferably between about 7 to 9 microns. In some embodiments, $R_2$ may be greater than 8, greater than 9 microns, or greater than 10 microns and less than 16 microns, less than 14 microns or less than 12 microns. In other embodiments, $R_2$ may be greater than 20 microns or even greater than 23 microns. In some embodiments, the ratio of the core radius $r_1$ over the inner cladding region 2 radius $r_2$ is preferably greater than 0.25, more preferably between about 0.3 to 0.55. In some embodiments, the ratio of radius $r_1$ to radius $r_2$ is greater than 0.25. In some embodiments, $r_1/r_2$ is greater than or equal to 0.25, more preferably greater than 0.3, and even more preferably greater than 0.4. In some other embodiments, $r_1/r_2$ is less than 0.25 and greater than 0.15, more preferably greater than 0.20.

Outer cladding region 3 surrounds the depressed annular region 3 and comprises refractive index delta percent $\Delta_4$ which is higher than the index $\Delta_2$ of inner cladding region 2, thereby forming a region which is an "updoped" outer cladding region 3 with respect to inner cladding region 2, e.g. by adding an amount of dopant (such as germania or chlorine) sufficient to increase the refractive index of the outer cladding region. Note, however, that it is not critical that region 3 be updoped in the sense that an index increasing dopant must be included in region 3. Indeed, the same sort of raised index effect in outer cladding region 3 may be achieved by down-doping inner cladding region 2 with respect to outer cladding region 3. However, in some embodiments, there is no fluorine or other down dopants in inner cladding region 2, and region 3 comprises an updopant, for example chlorine. Outer cladding region 3 comprises a higher refractive index than inner cladding region 2, and preferably comprises refractive index delta percent $\Delta_4$ which is greater than 0.002, preferably at least 0.005, for example at least 0.01, and may be greater than 0.02 or 0.03 percent delta. Preferably, the higher index portion (compared to inner cladding region 2) of outer cladding region 3 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" third annular region extend at least to a radial point of about 30 microns. Consequently, the volumes of $V_2$ and $V_3$ of the second and third annular regions 2 and 3, respectively, are defined herein being calculated using $\Delta(3-2)(r)rdr$ between radius $r_1$ and $r_2$ in the case of $V_2$, and $r_2$ and r30 (the radius at 30 microns) in the case of $V_3$, and thus are defined as $$V_2 = 2\int_{r1}^{r2} \Delta_{(4-2)}(r)r\,dr \text{ and}$$

$$V_3 = 2\int_{r2}^{r30} \Delta_{(4-2)}(r)r\,dr$$

All volumes are in absolute magnitude (i.e., $V_2=|V_2|$, $V_3=|V_3|$, etc.). The volume $V_2$ of the inner cladding region compared to that of the outer cladding region 3, is preferably greater than 0.7, more preferably greater than 2, and may be greater than 10% $\Delta$ micron$^2$, and in some embodiments may be greater than 20% $\Delta$ micron$^2$. This volume $V_2$ of the inner cladding region is in some embodiments greater than 2% $\Delta$ micron$^2$ and less than 20% $\Delta$ micron$^2$. Preferably, $|V_3|$ is at least 2.5% $\Delta$ micron$^2$.

The volume $V_3$ of the outer cladding region (inside 30 microns) compared to that of the inner cladding region 2, is preferably greater than 5, more preferably greater than 7, and may be greater than 10% $\Delta$ micron$^2$, and in some embodiments may be greater than 20% $\Delta$ micron$^2$. This volume $V_3$ of the outer cladding region (inside 30 microns) is in some embodiments less than 80% $\Delta$ micron$^2$.

In some embodiments, the refractive index $\Delta_4$ of the outer cladding region is greater than 0.002, in some embodiments greater than 0.005, in some embodiments at least 0.007, and in some embodiments at least 0.01 percent and more preferably greater than 0.02 percent, when compared to that of the inner cladding region 2. In some embodiments, the third annular region comprises chlorine (Cl) in an amount greater than 200 ppm when compared to that of the inner cladding region 2, for example greater than 400 or 700 or 1000 ppm or more, and in some embodiments preferably greater than 1500 ppm, and, in some embodiments, most preferably greater than 2000 ppm (0.2%) by weight (e.g., 2200 ppm, 2500 ppm, 3000 ppm, 4000 ppm, 5000 ppm, 6000 ppm, 10000 ppm, or there between). Chlorine concentration is described herein in units of parts per million by weight (abbreviated as ppm wt. or ppm, herein).

The core region 1 preferably has a positive refractive index throughout. The core 1 comprises a maximum relative refractive index $\Delta_{MAX}$ occurring between r=0 and r=3 microns. $\Delta_{MAX}$ is preferably greater than 0.32-0.70%.

The inner cladding region 2 preferably has a substantially constant relative refractive index profile, i.e. the difference between the relative refractive index at any two radii within the intermediate region is less than 0.02%, and in some preferred embodiments less than 0.01%. Thus, the relative refractive index profile of the inner cladding region 20 preferably has a substantially flat shape.

The core region 1 may be a step index core, and may comprise an alpha ($\alpha$) shape. In preferred embodiments, $R_1$ is less than 8.0 microns, and more preferably is between 4.0 microns and 7.0 microns. The fibers are capable of exhibiting a bend loss of less than 0.5 dB/turn when wound upon on a 20 mm radius mandrel for fibers with MAC numbers greater than 7.5. In some embodiments, the optical fibers disclosed herein have a MAC number of greater than 7.6 or 7.7, or in some embodiments greater than or equivalent to 8, and a zero dispersion wavelength of less than 1450 nm, more preferably less than 1330 nm and greater than 1300 nm.

The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which is hereby incorporated by reference.

Various exemplary embodiments will be further clarified by the following examples. It will be apparent to those skilled in the art that various modifications and variations can be made without departing from the spirit or scope of the claims.

Tables 1, 2a and 2b below list characteristics of modeled comparative example 1 and illustrative examples 2-8 having a refractive index as shown in FIG. 1. In particular, set forth below for each example is the refractive index delta $\Delta_1$, core alpha, and outer radius $R_1$ of the central core region 1, refractive index delta $\Delta_2$ and outer radius $R_2$ inner cladding region 2 and profile volume $V_2$ of the inner cladding region 2, which is calculated between $R_1$ and $R_2$, refractive index delta $\Delta_4$ and volume $V_3$ of the outer cladding region 3, which is calculated between inner radius $R_2$ of outer cladding region 3 and a radial distance of 30 microns (and between the refractive index $\Delta_4$ and that of $\Delta_2$). Also set forth are chromatic dispersion and dispersion slope at 1310 nm, chromatic dispersion and dispersion slope at 1550 nm, mode field diameter at 1310 nm and 1550 nm, lateral load wire mesh microbend at 1550 nm, pin array macrobend at 1550 nm, zero dispersion wavelength, 22 m cable cutoff, MAC number at 1310 nm, the improvement in lateral load wire mesh microbend at 1550 nm compared to comparative example 1, the improvement in pin array bend loss at 1550 nm compared to comparative example 1, 1×20 mm diameter bend loss, spectral attenuation at 1310 and 1550 nm.

TABLE 1

| Parameter | Comparative Example | Example 1 | Example 2 | Example 3 | Example 4 | Example 5 | Example 6 | Example 7 | Example 8 |
|---|---|---|---|---|---|---|---|---|---|
| $\Delta_1$ (%) | 0.34 | 0.35 | 0.355 | 0.36 | 0.365 | 0.36 | 0.37 | 0.38 | 0.39 |
| R1 (micron) | 4.5 | 4.6 | 4.65 | 4.65 | 4.7 | 4.7 | 4.75 | 4.8 | 4.8 |
| Core Alpha | 20 | 20 | 20 | 20 | 20 | 20 | 20 | 20 | 20 |
| R2 (micron) | 4.5 | 13.8 | 13.95 | 13.95 | 14.1 | 9 | 7 | 6.5 | 6.5 |
| $\Delta_2$ (%) | 0 | 0 | 0 | 0 | 0 | 0 | 0 | 0 | 0 |
| $\Delta_4$ (%) | 0.000 | 0.010 | 0.015 | 0.020 | 0.025 | 0.020 | 0.030 | 0.040 | 0.050 |
| V2 (% micron$^2$) | 0.0 | 1.7 | 2.6 | 3.5 | 4.4 | 1.2 | 0.8 | 0.8 | 1.0 |
| V3 (% micron$^2$) | 0.0 | 7.1 | 10.6 | 14.1 | 17.5 | 16.4 | 25.5 | 34.3 | 42.9 |
| Dispersion at 1310 nm (ps/nm/km) | 0.00 | 0.43 | 0.61 | 0.69 | 0.87 | 0.69 | 0.69 | 0.69 | 0.69 |
| Dispersion Slope at 1310 nm (ps/nm$^2$/km) | 0.0862 | 0.0865 | 0.0867 | 0.0867 | 0.0867 | 0.0865 | 0.0862 | 0.0863 | 0.086 |
| Dispersion 1550 nm (ps/nm/km) | 17.0 | 17.5 | 17.7 | 17.8 | 18.0 | 17.7 | 17.6 | 17.7 | 17.6 |
| Dispersion Slope 1550 nm (ps/nm$^2$/km) | 0.0577 | 0.0577 | 0.0578 | 0.0577 | 0.0578 | 0.0572 | 0.0577 | 0.0573 | 0.0570 |
| MFD at 1310 nm (micron) | 9.18 | 9.17 | 9.16 | 9.14 | 9.13 | 9.18 | 9.19 | 9.21 | 9.17 |
| MFD at 1550 nm (micron) | 10.40 | 10.33 | 10.30 | 10.24 | 10.22 | 10.31 | 10.33 | 10.35 | 10.30 |
| LLWM at 1550 nm, dB/m | 0.549 | 0.456 | 0.419 | 0.400 | 0.378 | 0.424 | 0.427 | 0.417 | 0.42 |
| Pin Array at 1550 nm, dB | 9.16 | 7.97 | 7.42 | 7.64 | 7.08 | 7.13 | 6.81 | 6.42 | 6.81 |
| Lambda 0 (nm) | 1310 | 1305 | 1303 | 1302 | 1300 | 1302 | 1302 | 1302 | 1302 |
| Cable Cutoff (nm) | 1177 | 1182 | 1184 | 1187 | 1189 | 1185 | 1202 | 1212 | 1200 |
| MAC # (1310 nm MFD/CableCutoff) | 7.80 | 7.76 | 7.73 | 7.70 | 7.68 | 7.74 | 7.64 | 7.60 | 7.64 |
| LLWM % improvement vs. Comparative Example at 1550 nm | 0 | 20 | 31 | 37 | 45 | 29 | 29 | 32 | 31 |
| Pin Array % improvement vs. Comparative Example at 1550 nm | 0 | 15 | 23 | 20 | 29 | 28 | 35 | 43 | 35 |
| 1 × 20 mm bend loss, 1550 nm (dB/turn) | 0.50 | 0.37 | 0.32 | 0.30 | 0.25 | 0.32 | 0.30 | 0.28 | 0.28 |
| 1 × 30 mm bend, 1550 nm (dB/turn) | 0.025 | 0.019 | 0.016 | 0.016 | 0.014 | 0.016 | 0.014 | 0.013 | 0.013 |
| Attn at 1550 nm dB/km | 0.191 | 0.191 | 0.191 | 0.191 | 0.191 | 0.191 | 0.191 | 0.191 | 0.191 |
| Attn at 1310 nm dB/km | 0.332 | 0.332 | 0.332 | 0.332 | 0.332 | 0.332 | 0.332 | 0.332 | 0.332 |

Table 3 below list characteristics of actual manufactured illustrative examples 21 and 22 with a primary coating applied thereto having a Young's modulus of about 0.9 MPa and a secondary having a Young's modulus of about 1200 MPa, having a refractive index profile as shown in FIG. 1. Fibers from examples 21 and 22 were drawn from optical preforms on a draw furnace. In particular, set forth below for each example is the refractive index delta $\Delta_1$, core alpha and outer radius $R_1$ of the central core region 1, refractive index delta $\Delta_2$ and outer radius $R_2$ inner cladding region 2 and profile volume $V_2$ of the inner cladding region 2, which is calculated between $R_1$ and $R_2$, refractive index delta $\Delta_4$ and volume $V_3$ of the outer cladding region 3, which is calculated between inner radius $R_2$ of outer cladding region 3 and a radial distance of 30 microns (and between the refractive index $\Delta_4$ and that of $\Delta_2$). Also set forth are chromatic dispersion and dispersion slope at 1310 nm, chromatic dispersion and dispersion slope at 1550 nm, mode field diameter at 1310 nm and 1550 nm, lateral load wire mesh microbend at 1550 nm, wire mesh covered drum microbend test at 1550 nm, pin array macrobend at 1550 nm, zero dispersion wavelength, 22 m cable cutoff, MAC number at 1310 nm, 1Δ20 mm diameter bend loss, spectral attenuation at 1310 and 1550 nm, the improvement in lateral load wire mesh microbend at 1550 nm compared to comparative example 1, and the improvement in pin array bend loss at 1550 nm compared to comparative example 1. In Tables 2a and 2b, these properties are measured on actual optical fibers for examples 9 and 12, except for LLWM and pin array which are modeled, and the properties shown were modeled on optical fibers examples 10, 11 and 13-15. In addition, comparative example 1 was manufactured and the wire mesh covered drum microbend test at 1550 nm was performed and yielded 0.07 dB/km loss.

TABLE 2a

| Parameter | Ex. 9 | Ex. 10 | Ex. 11 | Ex 12 | Ex. 13 | Ex. 14 | Ex. 15 | Ex. 16 | Ex. 17 |
|---|---|---|---|---|---|---|---|---|---|
| Δ1 (%) | 0.402 | 0.473 | 0.417 | 0.402 | 0.473 | 0.450 | 0.483 | 0.402 | 0.402 |
| R1 (micron) | 5.75 | 6.5 | 5.55 | 5.75 | 6.5 | 6.00 | 6.03 | 5.75 | 5.75 |
| Core Alpha | 2.20 | 1.00 | 2.20 | 2.20 | 1.00 | 2.2 | 2.2 | 2.2 | 2.2 |
| R2 (micron) | 13.82 | 18.52 | 13.52 | 13.82 | 18.52 | 13.82 | 13.95 | 25 | 25 |
| Δ2 (%) | 0 | −0.3 | 0 | 0 | −0.3 | 0 | 0 | 0 | 0.015 |
| Δ4 (%) | 0.03 | 0.07 | 0.04 | 0.03 | 0.07 | 0.07 | 0.07 | 0.03 | 0.035 |
| V2 (% micron$^2$) | 4.7 | 111.3 | 6.1 | 4.7 | 111.3 | 10.8 | 11.1 | 17.8 | 11.8 |
| V3 (% micron$^2$) | 21.3 | 39.0 | 28.7 | 21.3 | 39.0 | 49.6 | 49.4 | 8.25 | 9.6 |
| Dispersion at 1310 nm (ps/nm/km) | −0.204 | −0.775 | −0.510 | −0.204 | −0.775 | −0.336 | −0.222 | −0.20 | −0.204 |
| Dispersion Slope at 1310 nm (ps/nm$^2$/km) | 0.089 | 0.088 | 0.089 | 0.089 | 0.088 | 0.090 | 0.090 | 0.089 | 0.089 |
| Dispersion at 1550 nm (ps/nm/km) | 17.17 | 16.60 | 16.98 | 17.17 | 16.60 | 17.01 | 17.19 | 17.15 | 17.16 |
| Dispersion at Slope 1550 nm (ps/nm$^2$/km) | 0.060 | 0.056 | 0.061 | 0.060 | 0.056 | 0.060 | 0.060 | 0.057 | 0.056 |
| MFD at 1310 nm (micron) | 9.20 | 9.20 | 9.00 | 9.20 | 9.20 | 8.80 | 8.60 | 9.2 | 9.2 |
| MFD at 1550 nm (micron) | 10.48 | 10.48 | 10.25 | 10.48 | 10.48 | 9.96 | 9.70 | 10.48 | 10.48 |
| LLWM @ 1550 nm, dB/m | 0.36 | 0.58 | 0.27 | 0.36 | 0.58 | 0.12 | 0.04 | 0.34 | 0.36 |
| WMCD at 1550 nm, dB/km | 0.05 | 0.05 | 0.04 | 0.05 | 0.05 | 0.02 | 0.01 | 0.024 | 0.028 |
| Pin Array at 1550 nm, dB | 4.65 | 8.32 | 3.47 | 4.65 | 8.32 | 1.46 | 0.42 | 4.6 | 4.65 |
| Lambda 0 (nm) | 1315 | 1318 | 1316 | 1315 | 1318 | 1317 | 1316 | 1315 | 1315 |
| Cable Cutoff (nm) | 1200 | 1200 | 1200 | 1200 | 1200 | 1200 | 1250 | 1215 | 1200 |
| MAC # (MFD at 1310 nm/Cable Cutoff) | 7.67 | 7.67 | 7.5 | 7.67 | 7.67 | 7.34 | 6.88 | 7.57 | 7.67 |
| 1 × 20 mm bend loss at 1550 nm (dB/turn) | 0.3 | 0.2 | 0.2 | 0.3 | 0.2 | 0.10 | 0.10 | 0.30 | 0.30 |
| Attn at 1550 nm, dB/km | 0.189 | 0.188 | 0.190 | 0.181 | 0.182 | 0.185 | 0.187 | 0.181 | 0.181 |
| Attn at 1310 nm, dB/km | 0.330 | 0.328 | 0.331 | 0.320 | 0.318 | 0.322 | 0.324 | 0.318 | 0.318 |

TABLE 2b

| Parameter | Ex 18 | Ex 19 | Ex 20 |
|---|---|---|---|
| Δ1 (%) | 0.41 | 0.42 | 0.4 |
| R1 (micron) | 6 | 6 | 5.86 |
| Core Alpha | 2 | 2 | 2 |
| R2 (micron) | 30 | 30 | 29.3 |
| Δ2 (%) | 0 | 0 | 0 |
| Δ4 (%) | 0.05 | 0.05 | 0.03 |
| V2 (% micron$^2$) | 43.2 | 43.2 | 24.7 |
| V3 (% micron$^2$) | 0 | 0 | 1.25 |
| Dispersion at 1310 nm (ps/nm/km) | −0.129 | −0.101 | −0.473 |
| Dispersion Slope 1310 at nm (ps/nm$^2$/km) | 0.089 | 0.089 | 0.089 |
| Dispersion at 1550 nm (ps/nm/km) | 17.23 | 17.27 | 16.82 |
| Dispersion Slope at 1550 nm (ps/nm$^2$/km) | 0.06 | 0.06 | 0.06 |
| MFD at 1310 nm (micron) | 9.2 | 9.1 | 9.2 |
| MFD at 1550 nm (micron) | 10.45 | 10.34 | 10.51 |
| LLWM at 1550 nm, dB/m | 0.228 | 0.208 | 0.245 |
| WMCD at 1550 nm, dB/km | 0.05 | 0.04 | 0.05 |

TABLE 2b-continued

| Parameter | Ex 18 | Ex 19 | Ex 20 |
|---|---|---|---|
| Pin Array at 1550 nm, dB | 22.36 | 17.32 | 19.91 |
| Lambda 0 (nm) | 1311 | 1311 | 1315 |
| Cable Cutoff (nm) | 1189 | 1208 | 1152 |
| MAC # (MFD at 1310 nm/CableCutoff) | 7.73 | 7.55 | 7.98 |
| 1 × 20 mm bend loss (dB/turn) | 0.09 | 0.06 | 0.25 |
| Attn at 1550 nm, dB/km | 0.187 | 0.188 | 0.188 |
| Attn at 1310 nm, dB/km | 0.327 | 0.329 | 0.328 |

As can be seen in Tables 1, 2a and 2b above, the examples herein illustrate exemplary fibers which employ a central glass core region having index $\Delta_1$, a first inner cladding region having index $\Delta_2$, and an outer cladding region having index $\Delta_4$; wherein $\Delta_1 > \Delta_4 > \Delta_2$, wherein the difference between $\Delta_4$ and $\Delta_2$ is greater than or equal to 0.01 and an absolute value of profile volume, $|V_3|$ is at least 5% micron$^2$. These fibers exhibit a cable cutoff less than or equal to 1260 nm and a bend loss of less than 0.75 dB/turn when wound upon on a 20 mm diameter mandrel. These fibers also exhibit a mode field diameter between about 8.2 and 9.5 microns at 1310 nm, a zero dispersion wavelength between 1300 and 1324 nm, a dispersion slope at 1310 nm which is less than or equal to 0.092 ps/nm$^2$/km). These fibers exhibit a Wire Mesh Covered Drum (WMCD) bend loss at 1550 nm which is less than or equal to 0.07 dB/km, more preferably less than or equal to 0.06 dB/km, and in some embodiments less than or equal to 0.05 dB/km. These fibers also exhibit a pin array bend loss at 1550 nm which is less than 8.5 dB, more preferably less than 5 dB and in some embodiments less than 4 dB.

Table 3 below list characteristics of illustrative fiber examples 21 and 22. In these embodiments 21 and 22 the amount of Cl in the outer cladding region 3 is 1700 pm, and 1400 ppm, respectively, and the Cl content in region 2 is 1000 ppm.

TABLE 3

| Parameter | Example 21 | Example 22 |
|---|---|---|
| Δ1 (%) | 0.403 | 0.404 |
| R1 (micron) | 5.35 | 5.26 |
| Core Alpha | 2.2 | 2.2 |
| R2 (micron) | 13.4 | 13.20 |
| R1/R2 | 0.40 | 0.40 |
| Δ2 (%) | 0 | 0 |
| Δ4 (%) | 0.007 | 0.004 |
| V2 (% micron$^2$) | 1.1 | 0.6 |
| V3 (% micron$^2$) | 5.0 | 2.9 |
| Dispersion 1310 nm (ps/nm/km) | −0.51 | −0.20 |
| Dispersion Slope 1310 nm (ps/nm$^2$/km) | 0.089 | 0.089 |
| Dispersion 1550 nm (ps/nm/km) | 17.0 | 17.2 |
| Dispersion Slope 1550 nm (ps/nm$^2$/km) | 0.0600 | 0.06 |
| MFD 1310 nm (micron) | 9.20 | 9.2 |
| MFD 1550 nm (micron) | 10.48 | 10.48 |
| LLWM @ 1550 nm | 0.4 | 0.52 |
| Pin Array @ 1550 nm | 5.11 | 6.02 |
| Lambda 0 (nm) | 1316 | 1318 |
| Cable Cutoff (nm) | 1200 | 1200 |
| MAC # (1310 nm MFD/CabCutoff) | 7.67 | 7.67 |
| LLWM % improvement vs. Comparative Example at 1550 nm | 37 | 6 |
| Pin Array % improvement vs. Comparative Example at 1550 nm | 79 | 52 |
| 1 × 20 mm bend loss at 1550 nm (dB/turn) | 0.40 | 0.60 |
| WMCD at 1550 nm, dB/Km | 0.05 | 0.07 |
| Attn at 1550 nm, dB/km | 0.189 | 0.189 |
| Attn at 1310 nm, dB/km | 0.33 | 0.33 |

As can be seen in both example fibers of Tables 3 above, exemplary fiber embodiments employ a central glass core region having index $\Delta_1$, a first inner cladding region having index $\Delta_2$, and an outer cladding region having index $\Delta_4$; wherein $\Delta_1 > \Delta_4 > \Delta_2$, wherein the difference between $\Delta_4$ and $\Delta_2$ is greater than or equal to 0.004 and an absolute value of profile volume, $|V_3|$ is at least 2.5% micron$^2$. These exemplary fiber embodiments exhibit a cable cutoff less than or equal to 1260 nm and a bend loss of less than 0.75 dB/turn when wound upon on a 20 mm diameter mandrel. These exemplary fiber embodiments also exhibit a mode field diameter between about 8.2 and 9.5 microns at 1310 nm, a zero dispersion wavelength between 1300 and 1324 nm, a dispersion slope at 1310 nm which is less than or equal to 0.092 ps/nm$^2$/km). These exemplary fiber embodiments exhibit a Wire Mesh Covered Drum (WMCD) bend loss at 1550 nm which is less than or equal to 0.07 dB/km, more preferably less than or equal to 0.06 dB/km, and in some embodiments less than or equal to 0.05 dB/km. These exemplary fiber embodiments also exhibit a pin array bend loss at 1550 nm which is less than 8.5 dB, more preferably less than 7 dB.

Many of these fibers also exhibit a bend loss at 1550 nm, when wound upon on a 15 mm diameter mandrel, of less than 1 dB/turn, and in some cases less than 0.5 dB/turn. These fibers also exhibit a bend loss at 1550 nm, when wound upon on a 20 mm diameter mandrel, of less than 0.75 dB/turn, more preferably less than 0.3 dB/turn, and some fibers most preferably less than 0.1 dB/turn. These fibers also exhibit a bend loss at 1550 nm, when wound upon on a 30 mm diameter mandrel, of less than 0.025 dB/turn, and some fibers more preferably less than 0.003 dB/turn. Some of these examples employ chlorine in the outer cladding region in an amount greater than 1200 ppm, for example between 1200 ppm and 12000 ppm. Some of these examples employ chlorine in the outer cladding region in an amount greater than or equal to 1400 ppm. Some of these examples employ chlorine in the outer cladding region in an amount greater than 1400 ppm and less than 3000 ppm. Some of these examples employ chlorine in the outer cladding region in an amount greater than 2000 ppm, and in some cases greater than 3000 or even greater than 4000 ppm by weight. In some embodiments the outer cladding region comprises chlorine in an amount greater than 2000 and less than 12000 ppm by weight.

Attenuation at 1550 nm is preferably less than 0.21 dB/km, more preferably less than 0.20 dB/km, even more preferably less than 0.197 dB/km. In some preferred embodiments the attenuation at 1550 nm is less than or equal to 0.191 dB/km, even more preferably less than or equal to 0.189 dB/km, even more preferably less than or equal to 0.186 dB/km, even more preferably less than or equal to 0.184 dB/km, and most preferably less than or equal to 0.182 dB/km.

Figure 2:
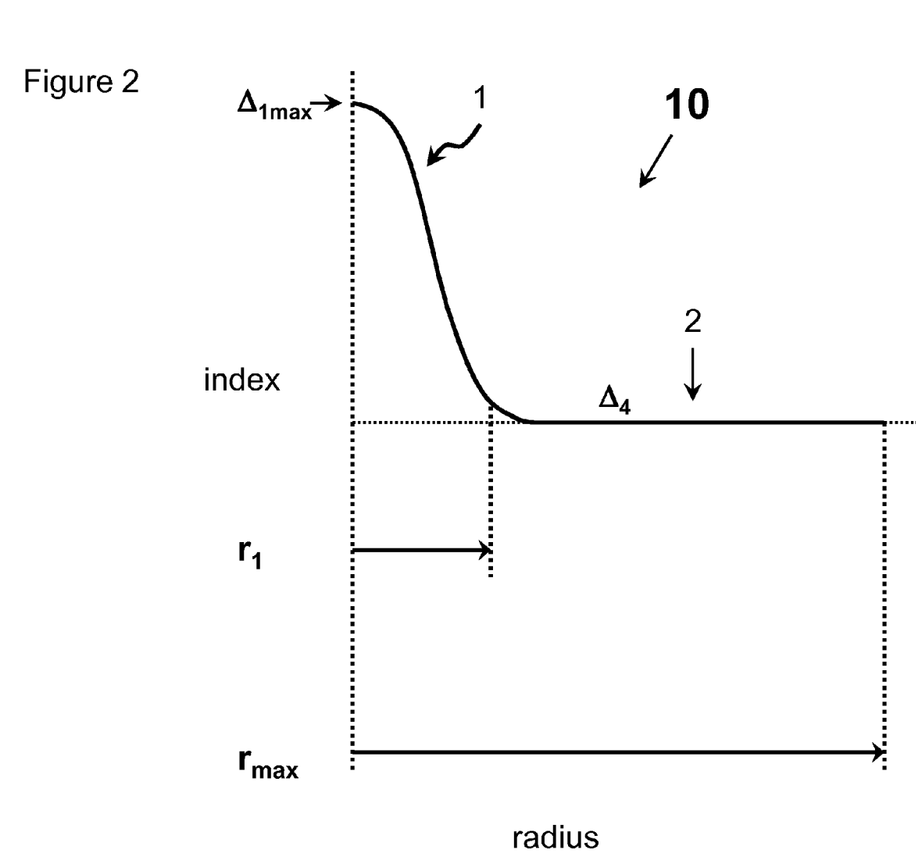
FIG. 2 shows a refractive index profile comprising a super Gaussian core profile according to an alternative embodiment.

An alternative embodiment is illustrated in FIG. 2, which shows a refractive index profile of a fiber comprising a super Gaussian core refractive index profile. We have discovered that using a super-Gaussian core profile further lowers the attenuation of the optical fiber. We believe this is due to a smoother transition of the index and viscosity of the glass from the core to the cladding. In addition, we believe the optical power in an optical fiber follows a Gaussian profile and therefore the super-Gaussian index profile follows the power better than an alpha profile. The improved attenuation may be a result of lowering of small angle scattering. Data is shown below in Table 4 and Table 5 for modeled and manufactured fibers, respectively.

A super-Gaussian profile follows the following equation:

$$\% \Delta(r) = \% \Delta_{1max} \cdot EXP(-((r/a)^\gamma)) \quad \text{(Eq. 1)}$$

where r=radial position from center location,
a=radial scaling parameter corresponding to the radial location where $\% \Delta = (\% \Delta_{max}/e)$,
e is that is the base of the natural logarithm (~2.71828 . . . )
and γ (gamma)=is a positive number.
In FIG. 2, a is preferably greater than 4.5, more preferably greater than 4.6, and most preferably greater than 4.7.

Figure 3:
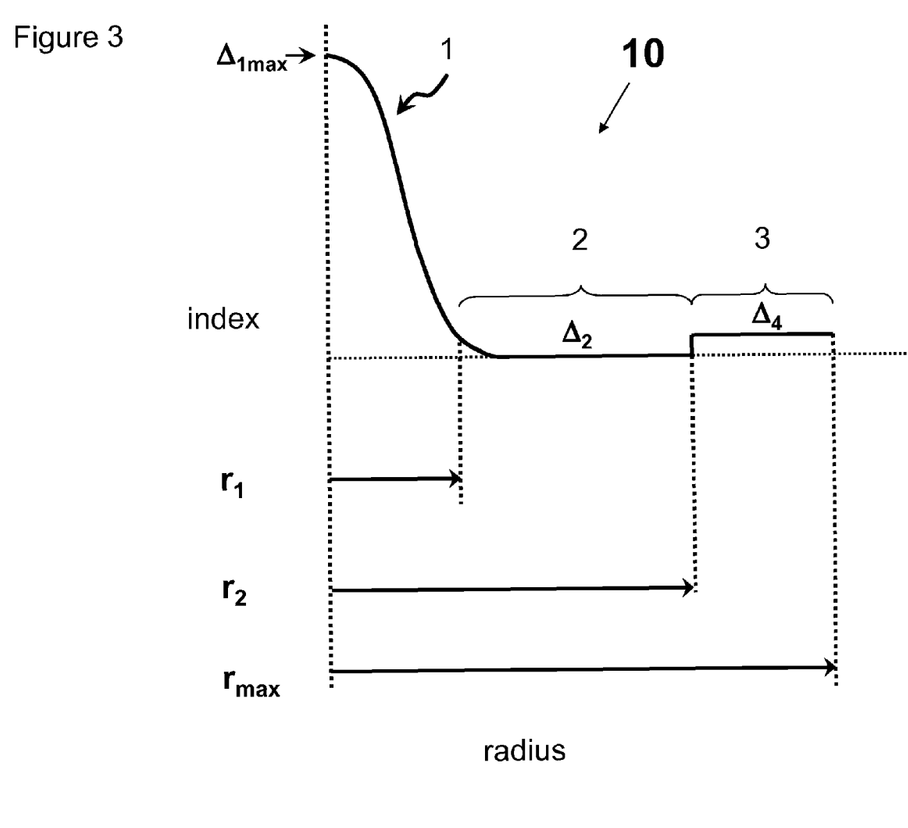
FIG. 3 shows a refractive index profile comprising a super Gaussian core profile surrounded by a raised outer cladding region according to an alternative embodiment of an optical waveguide fiber as disclosed herein.
Figure 4:
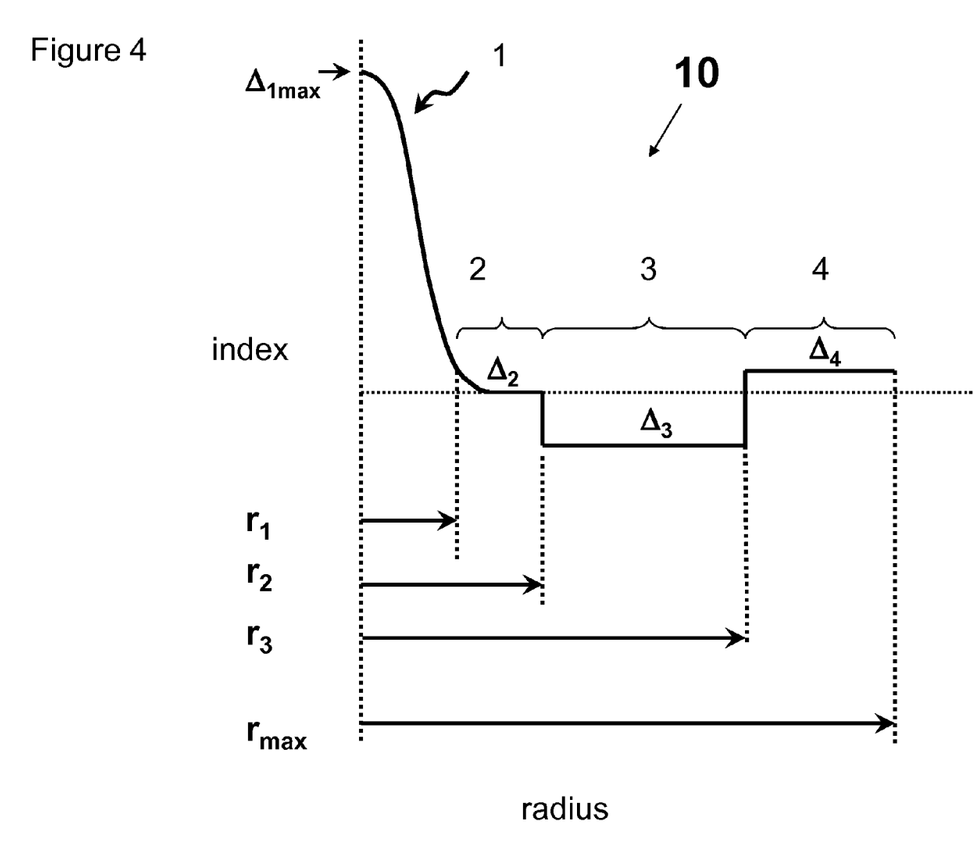
FIG. 4 shows a refractive index profile comprising a super Gaussian core profile surrounded by a depressed cladding region and a raised outer cladding region according to an alternative embodiment of an optical waveguide fiber as disclosed herein.

FIG. 3 shows a refractive index profile comprising a super-Gaussian core profile region 1 having $\Delta_1$ surrounded by an inner cladding region 2 having $\Delta_2$ and a raised outer cladding region 3 comprising $\Delta_4$ according to an alternative embodiment of an optical waveguide fiber as disclosed herein. The difference between deltas of $\Delta_4$ and $\Delta_2$ is preferably greater than 0.002 delta % and said fiber exhibits a MAC number>7.5. In the embodiment illustrated in FIG. 3, core profile segment 1 is a super-Gaussian refractive index profile, inner cladding 2 is preferably substantially undoped silica, and updoped cladding region 3 comprises germania or chlorine or other index increasing dopant in an amount sufficient to raise the refractive index delta $\Delta_4$, is preferably at least 0.002%, more preferably at least 0.005%. In some embodiments, the difference between $\Delta_4$ and $\Delta_2$ is between 0.03 and 0.06, and in some embodiments the difference between $\Delta_4$ and $\Delta_2$ is between 0.07 and 0.1 percent FIG. 4 shows an alternative refractive index profile which comprises a super-Gaussian core profile. In the profile shown in FIG. 4, super-Gaussian core refractive index profile region 1 which comprises $\Delta_1$ is surrounded by an inner cladding region 2 comprising $\Delta_2$. Inner cladding region 2 is surrounded by depressed cladding region 3 comprising $\Delta_3$ which is in turn surrounded by outer raised cladding region 4 comprising $\Delta_4$. The difference between deltas of $\Delta_4$ and $\Delta_2$ is preferably greater than 0.002 delta % and said fiber exhibits a MAC number>7.5. In the embodiment illustrated in FIG. 4, core profile segment 1 is a super-Gaussian profile, inner cladding 2 is preferably substantially undoped silica, depressed cladding region 3 is fluorine doped silica having an index of $\Delta_3$, with a $\Delta_{3min}$ and a trench alpha, and outer cladding region 4 comprises germania or chlorine in an amount sufficient to raise the refractive index delta $\Delta_4$ preferably at least 0.002%, more preferably at least 0.005% with respect to inner cladding region 2. With respect to the refractive index of pure silica, $\Delta_4$ is preferably greater than 0.0, more preferably greater than 0.01 and more preferably greater than 0.02.

Tables 4a and 4b below list characteristics of modeled illustrative examples 23 and 25-30 having a refractive index as shown in FIG. 2, Examples 24 and 31-32 having a refractive index as shown in FIG. 3, and examples 33-34 having a refractive index as shown in FIG. 4. In particular, set forth below for each example is the refractive index delta $\Delta_1$, outer radius $R_1$ of the central core region 1, core alpha, radial scaling parameter a, core γ (gamma), outer radius $R_2$ of inner cladding region 2, ratio of core radius to inner cladding radius $R_1/R_2$, refractive index delta $\Delta_2$ of inner cladding region 2, outer radius $R_3$ and refractive index delta $\Delta_3$ of depressed cladding region 3, alpha of depressed cladding region 3, and volume $V_2$ of $0.3 \leq V_2 \leq 60$, which is calculated between $r_1$ and $r_2$, refractive index delta $\Delta_4$ of region 3, volume $V_3$ which is calculated between R3 and a distance 30 microns from the center of the fiber, and $R_{max}$ which is the outer diameter of the optical fiber. Also set forth are LP01 cutoff wavelength, LP11 cutoff wavelength, chromatic dispersion and dispersion slope at 1310 nm, chromatic dispersion and dispersion slope at 1550 nm, attenuation at 1550 nm, effective area at 1550 nm, mode field diameter at 1310 nm and 1550 nm, wire mesh microbend at 1550 nm, pin array bend loss at 1550 nm, wire mesh microbend at 1550 nm compared to comparative example 1, zero dispersion wavelength, cable cutoff, and MAC number.

TABLE 4a

Data for modeled fibers

| Parameter | Example 23 | Example 24 | Example 25 | Example 26 | Example 27 | Example 28 |
|---|---|---|---|---|---|---|
| $\Delta_{1max}$ (%) | 0.385 | 0.415 | 0.423 | 0.385 | 0.385 | 0.470 |
| $R_1$ (micron) | 6.10 | 5.30 | 6.06 | 6.49 | 6.81 | 7.16 |
| a (microns) | 4.64 | 4.54 | 4.56 | 4.88 | 5.12 | 4.56 |
| γ (gamma) | 3.0 | 3.5 | 3.0 | 3.0 | 3.0 | 2.0 |
| $R_2$ (micron) | not applicable | 14.4 | not applicable | not applicable | not applicable | not applicable |
| $R_1/R_2$ | not applicable | 0.37 | not applicable | not applicable | not applicable | not applicable |
| $\Delta_2$ (%) | not applicable | 0.00 | not applicable | not applicable | not applicable | not applicable |
| $R_3$ (micron) | not applicable | 14.4 | not applicable | not applicable | not applicable | not applicable |
| $V_2$ (% micron$^2$) | not applicable | 4.8 | not applicable | not applicable | not applicable | not applicable |
| Δ4 (%) | 0.00 | 0.03 | 0.00 | 0.00 | 0.00 | 0.00 |
| $V_3$ (% micron$^2$, in absolute magnitude, from R3 to 30 microns) | not applicable | 26.6 | not applicable | not applicable | not applicable | not applicable |
| $R_{max}$ (micron) | 62.5 | 62.5 | 62.5 | 62.5 | 62.5 | 62.5 |
| Cutoff LP01 (nm) | 5000 | 5000 | 5000 | 5000 | 5000 | 5000 |
| Cutoff LP11 (nm) | 1390 | 1309 | 1241 | 1327 | 1391 | 1548 |
| Dispersion 1310 nm (ps/nm/km) | 0.76 | 0.04 | −0.87 | −0.23 | 0.16 | −1.70 |
| Dispersion Slope 1310 nm (ps/nm$^2$/km) | 0.090 | 0.090 | 0.089 | 0.091 | 0.091 | 0.093 |
| Dispersion 1550 nm (ps/nm/km) | 16.8 | 17.5 | 16.8 | 17.5 | 18.0 | 16.4 |
| Dispersion Slope 1550 nm (ps/nm$^2$/km) | 0.061 | 0.060 | 0.061 | 0.062 | 0.062 | 0.063 |
| Attenuation at 1550 nm (dB/km) | <0.18 | <0.18 | <0.18 | <0.18 | <0.18 | <0.18 |
| MFD 1310 nm (micron) | 9.36 | 9.10 | 9.00 | 9.18 | 9.33 | 9.10 |
| MFD 1550 nm (micron) | 10.71 | 10.28 | 10.26 | 10.40 | 10.52 | 10.46 |

TABLE 4a-continued

Data for modeled fibers

| Parameter | Example 23 | Example 24 | Example 25 | Example 26 | Example 27 | Example 28 |
|---|---|---|---|---|---|---|
| Aeff at 1550 nm (microns$^2$) | 85.6 | 79.8 | 78.8 | 81.4 | 83.5 | 81.2 |
| LLWM at 1550 nm (dB/m) | 0.290 | 0.190 | 0.195 | 0.217 | 0.234 | 0.245 |
| Pin Array at 1550 nm (dB) | 7.75 | 5.69 | 9.00 | 4.70 | 2.97 | 1.98 |
| LLWM % improvement vs. Comparative Example at 1550 nm | 47 | 65 | 64 | 60 | 57 | 55 |
| Macrobend loss at 1550 nm (dB/turn on 20 mm diameter mandrel) | 0.34 | 0.37 | 0.93 | 0.49 | 0.33 | 0.07 |
| Lambda0 (nm) | 1318 | 1310 | 1320 | 1313 | 1308 | 1328 |
| Cable Cutoff (nm) | 1185 | 1117 | 1036 | 1122 | 1186 | 1343 |
| MAC # (MFD at 1310 nm/Cable Cutoff in microns) | 7.90 | 8.14 | 8.69 | 8.18 | 7.87 | 6.78 |

TABLE 4b

Data for modeled fibers.

| Parameter | Example 29 | Example 30 | Example 31 | Example 32 | Example 33 | Example 34 |
|---|---|---|---|---|---|---|
| $\Delta_{1max}$ (%) | 0.385 | 0.370 | 0.400 | 0.385 | 0.385 | 0.415 |
| $R_1$ (micron) | 6.17 | 5.82 | 5.47 | 5.11 | 5.64 | 4.91 |
| a (microns) | 4.64 | 4.64 | 4.48 | 4.56 | 4.32 | 4.16 |
| $\gamma$ (gamma) | 2.8 | 3.5 | 3.5 | 5.0 | 3.0 | 3.5 |
| $R_2$ (micron) | not applicable | not applicable | 13.44 | 13.68 | 8.60 | 8.28 |
| $R_1/R_2$ | not applicable | not applicable | 0.41 | 0.37 | 0.66 | 0.59 |
| $\Delta_2$ (%) | not applicable | not applicable | 0.00 | −0.03 | 0.00 | 0.00 |
| $R_3$ (micron) | not applicable | not applicable | 13.44 | 13.68 | 13.0 | 12.5 |
| $\Delta_{3\,min}$ (%) | not applicable | not applicable | not applicable | not applicable | −0.40 | −0.40 |
| trench alpha (alpha$_\square$) | not applicable | not applicable | not applicable | not applicable | 100 | 100 |
| $V_2$ (% micron$^2$) | not applicable | not applicable | 2.0 | 4.3 | 37.4 | 35.9 |
| $\Delta 4$ (%) | 0.00 | 0.00 | 0.015 | 0.00 | 0.00 | 0.03 |
| $V_3$ (% micron$^2$, in absolute magnitude, from R3 to 30 microns) | not applicable | not applicable | 10.8 | 21.4 | 0.0 | 24.9 |
| $R_{max}$ (micron) | 62.5 | 62.5 | 62.5 | 62.5 | 62.5 | 62.5 |
| Cutoff LP01 (nm) | 5000 | 5000 | 5000 | 5000 | 5000 | 5000 |
| Cutoff LP11 (nm) | 1365 | 1365 | 1273 | 1278 | 1189 | 1104 |
| Dispersion 1310 nm (ps/nm/km) | −0.89 | −0.54 | −0.781 | 0.210 | 0.300 | 0.101 |
| Dispersion Slope 1310 nm (ps/nm$^2$/km) | 0.089 | 0.089 | 0.089 | 0.088 | 0.084 | 0.089 |
| Dispersion 1550 nm (ps/nm/km) | 16.7 | 16.9 | 16.5 | 17.2 | 19.2 | 18.7 |
| Dispersion Slope 1550 nm (ps/nm$^2$/km) | 0.062 | 0.061 | 0.060 | 0.059 | 0.066 | 0.065 |
| Attenuation at 1550 nm (dB/km) | <0.18 | <0.18 | <0.18 | <0.18 | <0.18 | <0.18 |
| MFD 1310 nm (micron) | 9.57 | 9.37 | 9.02 | 8.80 | 9.00 | 8.57 |
| MFD 1550 nm (micron) | 11.00 | 10.81 | 10.30 | 9.92 | 10.10 | 9.59 |
| Aeff at 1550 nm (microns$^2$) | 89.9 | 85.7 | 79.5 | 74.8 | 76.9 | 70.0 |
| LLWM at 1550 nm (dB/m) | 0.380 | 0.280 | 0.20 | 0.14 | 0.16 | 0.11 |
| Pin Array at 1550 nm (dB) | 13.5 | 9.1 | 9.49 | 4.94 | 9.4 | 10.4 |
| LLWM % improvement vs. Comparative Example at 1550 nm | 31 | 49 | 64 | 74 | 0 | 80 |
| Macrobend loss at 1550 nm (dB/turn on 20 mm diameter mandrel) | 0.59 | 0.44 | 0.59 | 0.34 | 0.12 | 0.19 |
| Lambda0 (nm) | 1320 | 1341 | 1314 | 1307 | 1306 | 1307 |
| Cable Cutoff (nm) | 1160 | 1160 | 1242 | 1238 | 1243 | 1238 |
| MAC # (MFD at 1310 nm/Cable Cutoff in microns) | 8.25 | 8.08 | 7.26 | 7.11 | 7.24 | 6.92 |

Table 5 below list characteristics of actual manufactured illustrative examples 35-37 having a refractive index as shown in FIGS. 2-4. In particular, set forth below for each example is the refractive index delta $\Delta_1$, outer radius $R_1$ of the central core region 1, core alpha, radial scaling parameter a, core γ (gamma), outer radius $R_2$ of inner cladding region 2, ratio of core radius to inner cladding radius $R_1/R_2$, refractive index delta $\Delta_2$ of inner cladding region 2, outer radius $R_3$ and refractive index delta $\Delta_3$ of depressed cladding region 3, alpha of depressed cladding region 3 (trench alpha), and volume $V_2$ of $0.3 \leq V_2 \leq 60$, which is calculated between $r_1$ and $r_2$, refractive index delta $\Delta_4$ of region 3, volume $V_3$ which is calculated between R3 and a distance 30 microns from the center of the fiber, and $R_{max}$ which is the outer diameter of the optical fiber. 2 meter cable cutoff wavelength, chromatic dispersion and dispersion slope at 1310 nm, chromatic dispersion and dispersion slope at 1550 nm, attenuation at 1550 nm, mode field diameter at 1310 nm and 1550 nm, effective area at 1550 nm, macrobend loss at 1550 nm, zero dispersion wavelength, cable cutoff, and MAC number at 1310 nm. In examples 38 and 39 the amount of Cl in the outer cladding region 3 is 1400 pm, and 1700 ppm, respectively, and the Cl content in region 2 is 1000 ppm.

TABLE 5

Data for manufactured fibers

| Parameter | Example 35 | Example 36 | Example 37 |
|---|---|---|---|
| $\Delta_{1max}$ (%) | 0.438 | 0.395 | 0.391 |
| $R_1$ (micron) | 6.10 | 5.55 | 5.55 |
| Alpha$_{core}$ | not applicable | not applicable | not applicable |
| a (microns) | 4.60 | 4.67 | 4.67 |
| γ (gamma) | 3.0 | 4.0 | 4.0 |
| $R_2$ (micron) | not applicable | 13.14 | 13.14 |
| $R_1/R_2$ | not applicable | 0.42 | 0.42 |
| $\Delta_2$ (%) | not applicable | 0.00 | 0.00 |
| $R_3$ (micron) | not applicable | 13.14 | 13.14 |
| $\Delta_{3\ min}$ (%) | not applicable | not applicable | not applicable |
| trench alpha (alpha$_\square$) | not applicable | not applicable | not applicable |
| $V_2$ (% micron$^2$) | not applicable | 0.5 | 1.1 |
| Δ4 (%) | 0.00 | 0.008 | 0.004 |
| $V_3$ (% micron$^2$, in absolute magnitude, from R3 to 30 microns) | not applicable | 5.8 | 2.9 |
| $R_{max}$ (micron) | 62.5 | 62.5 | 62.5 |
| 2 meter Cutoff (nm) | 1320 | 1291 | 1317 |
| Dispersion 1310 nm (ps/nm/km) | −1.42 | −0.722 | −0.729 |
| Dispersion Slope 1310 nm (ps/nm$^2$/km) | 0.087 | 0.087 | 0.087 |
| Dispersion 1550 nm (ps/nm/km) | 16.1 | not measured | not measured |
| Dispersion Slope 1550 nm (ps/nm$^2$/km) | 0.061 | not measured | not measured |
| Attenuation at 1550 nm (dB/km) | 0.187 | 0.183 | 0.183 |
| MFD 1310 nm (micron) | 8.98 | 9.21 | 9.20 |
| MFD 1550 nm (micron) | 10.15 | 10.33 | 10.42 |
| Aeff at 1550 nm (microns$^2$) | 80.9 | 83.9 | 85.3 |
| Macrobend loss at 1550 nm (dB/turn on 20 mm diameter mandrel) | 0.4 | 0.4 | 0.4 |
| Zero dispersion wavelength, $\square$0 (nm) | 1326 | 1318 | 1318 |
| Cable Cutoff (nm) | 1246 | 1173 | 1200 |
| MAC # (MFD at 1310 nm/Cable Cutoff in microns) | 7.21 | 7.85 | 7.67 |

Table 6 below list characteristics of manufactured illustrative examples 38-46 having a refractive index as shown in FIG. 3. In particular, set forth below for each example is the refractive index delta $\Delta_1$, outer radius $R_1$ of the central core region 1, core alpha, radial scaling parameter a, core γ (gamma), outer radius $R_2$ of inner cladding region 2, ratio of core radius to inner cladding radius $R_1/R_2$, refractive index delta $\Delta_2$ of inner cladding region 2, refractive index delta $\Delta_4$ of region 3, volume $V_3$ which is calculated between R2 and a distance 30 microns from the center of the fiber. The outer diameter of the optical fiber in each case was 125 microns. Also set forth are 2 meter cable cutoff wavelength, attenuation at 1310, 1383, and 1550 nm, MAC number at 1310 nm, and 1×20 mm bend loss at 1550 nm and 1625 nm.

TABLE 6

Data for manufactured fibers

| | Ex. 38 | Ex. 39 | Ex. 40 | Ex. 41 | Ex. 42 | Ex. 43 | Ex. 44 | Ex. 45 | Ex. 46 |
|---|---|---|---|---|---|---|---|---|---|
| Δ1 (%) | 0.38 | 0.39 | 0.39 | 0.39 | 0.40 | 0.41 | 0.40 | 0.44 | 0.45 |
| R1 (micron) | 5.62 | 5.5 | 5.69 | 5.95 | 5.25 | 5.27 | 5.61 | 5.42 | 5.61 |
| Core Alpha | 2.92 | 2.53 | 2.5 | 2.36 | 3.160 | 3.27 | 2.61 | 2.6 | 2.47 |
| a (microns) | 4.83 | 4.62 | 4.72 | 4.86 | 4.72 | 4.78 | 4.93 | 4.78 | 5.04 |
| γ (gamma) | 4.16 | 3.87 | 4.06 | 4.00 | 4.48 | 4.42 | 4.19 | 4.21 | 4.19 |
| R2 (micron) | 10.18 | 10.91 | 10.18 | 10.91 | 11.1 | 10.73 | 10.91 | 10.55 | 11.29 |
| R1/R2 | 0.55 | 0.50 | 0.56 | 0.55 | 0.47 | 0.49 | 0.51 | 0.51 | 0.50 |
| Δ2 (%) | 0 | 0 | 0 | 0 | 0 | 0 | 0 | 0 | 0 |
| Δ4 (%) | 0.003 | 0.008 | 0.005 | 0.004 | 0.025 | 0.027 | 0.037 | 0.041 | 0.08 |
| V3 (%-micron$^2$) | 2.3 | 1.7 | 4 | 2.6 | 13.5 | 16.3 | 22.6 | 27 | 55.1 |
| MFD | 9.37 | 9.12 | 9.40 | 9.19 | 9.08 | 9.07 | 9.30 | 8.88 | 8.95 |
| Lambda0 | 1313.2 | 1319.2 | 1316.8 | 1314.7 | 1313.4 | 1312.3 | 1312.0 | 1313.6 | 1306.3 |
| CableCutoff | 1228.9 | 1183.3 | 1186.6 | 1226.9 | 1206.4 | 1207.8 | 1176 | 1204.7 | 1204.9 |
| Attn1310 nm (dB/km) | 0.329 | 0.322 | 0.332 | 0.335 | 0.334 | 0.334 | 0.331 | 0.339 | 0.343 |
| Attn1383 nm (dB/km) | 0.299 | 0.324 | 0.316 | 0.308 | 0.297 | 0.291 | 0.290 | 0.293 | 0.290 |
| Attn1550 nm (dB/km) | 0.189 | 0.184 | 0.187 | 0.190 | 0.188 | 0.195 | 0.190 | 0.193 | 0.197 |
| MAC # (1310 nm MFD/CableCutOff) | 6.980 | 7.088 | 7.079 | 6.889 | 7.061 | 7.155 | 7.349 | 6.989 | 7.199 |
| 1 × 20 mm bend loss, 1550 nm (dB/turn) | | | | 0.191 | 0.155 | 0.461 | 0.095 | 0.133 | |
| 1 × 20 mm bend loss, 1625 nm (dB/turn) | | | | 0.647 | 0.463 | 1.077 | 0.312 | 0.385 | |

Thus, the optical fibers described herein provide outstanding bending performance of less than 1 dB/turn on a 20 mm diameter mandrel and in some embodiments less than 0.5 dB/turn on a 20 mm mandrel, a zero dispersion wavelength, λ0, of less than 1350 nm, and in some embodiments of 1300 nm≤λ0≤1324 nm, and additionally provide cutoff wavelengths suitable for single mode operation at wavelengths greater than about 1260 nm, MDF at 1310 nm of between 8.2 and 9.5 microns, attenuation at 1550 nm of ≤0.189 dB/km and in some embodiments ≤0.185 dB/km, more specifically ≤0.183 dB/km.

In some embodiments, the core may comprise a relative refractive index profile having a so-called centerline dip which may occur as a result of one or more optical fiber manufacturing techniques. However, the centerline dip in any of the refractive index profiles disclosed herein is optional.

The optical fiber disclosed herein comprises a core and a cladding layer (or cladding or outermost annular cladding region) surrounding and directly adjacent the core. Preferably, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In preferred embodiments, the core of the optical fiber disclosed herein has a non-negative refractive index profile, more preferably a positive refractive index profile, wherein the core is surrounded by and directly adjacent to a cladding layer.

Preferably, the optical fiber disclosed herein has a silica-based core and cladding. In preferred embodiments, the cladding has an outer diameter, 2 times $R_{max}$, of about 125 micron.

The optical fiber disclosed herein may be surrounded by a protective coating, e.g. a primary coating P contacting and surrounding the outer cladding region 3, the primary coating P having a Young's modulus of less than 1.0 MPa, preferably less than 0.9 MPa, and in preferred embodiments not more than 0.8 MPa, and further comprises a secondary coating S contacting and surrounding the primary coating P, the secondary coating S having a Young's modulus of greater than 1200 MPa, and in preferred embodiments greater than 1400 MPa.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 micron) and 0.004" (102 micron) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

Preferably, the optical fibers disclosed herein have a low OH content, and preferably have an attenuation curve which exhibits a relatively low, or no, water peak in a particular wavelength region, especially in the E-band. The optical fiber disclosed herein preferably has an optical attenuation (spectral) at 1383 nm which is not more than 0.10 dB/km above an optical attenuation at 1310 nm, and more preferably not more than the optical attenuation at 1310 nm. The optical fiber disclosed herein preferably has a maximum hydrogen induced attenuation change of less than 0.03 dB/km at 1383 nm after being subjected to a hydrogen atmosphere, for example 0.01 atm partial pressure hydrogen for at least 144 hours.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
a central core region having outer radius $r_1$ and refractive index $\Delta_1$
a cladding region comprising a first inner cladding region having an outer radius $r_2>8$ microns and refractive index $\Delta_2$ and a second outer cladding region surrounding the inner cladding region and comprising refractive index $\Delta_4$, wherein $\Delta_1>\Delta_4>\Delta_2$, and wherein the difference between $\Delta_4$ and $\Delta_2$ is greater than 0.002%, $\Delta_4$ is greater than 0.0%, and said fiber exhibits a MAC number>7.5.

2. The optical fiber of claim 1, wherein the difference between $\Delta_4$ and $\Delta_2$ is greater than 0.005%.

3. The optical fiber of claim 1, wherein the difference between $\Delta_4$ and $\Delta_2$ is greater than 0.01%.

4. The optical fiber of claim 1, wherein said fiber exhibits a 22 m cable cutoff less than or equal to 1260 nm.

5. The optical fiber of claim 1, wherein the core of said fiber exhibits an alpha less than 10.

6. The optical fiber of claim 1, said fiber further exhibiting a wire mesh covered drum microbend loss at 1550 nm which is less than or equal to 0.07 dB/km.

7. The optical fiber of claim 1, wherein the first inner cladding region contains less than 0.02 wt % fluorine.

8. The optical fiber of claim 1, wherein the first inner cladding region is essentially free of fluorine and germania.

9. The optical fiber of claim 1, wherein $\Delta_4>\Delta_2$ for a length extending from $r_2$ to a radius of at least 30 microns.

10. The optical fiber of claim 1, wherein the profile volume, $V_3$ of the outer cladding region, calculated between the outer radius of the first inner cladding region and a radial distance of 30 micron, is equal to:

$$V_3 = 2\int_{r2}^{r30} \Delta_{(3-2)}(r)rdr$$

and $|V_3|$ is at least 2.5% $\Delta$micron$^2$.

11. The fiber of claim 1, wherein said fiber exhibits an attenuation at 1550 nm which is less than or equal to 0.186 dB/km.

12. The optical fiber of claim 1, wherein said core comprises a peak delta less than or equal to 0.70%.

13. An optical fiber comprising:
a central core region having outer radius $r_1$ and refractive index $\Delta_1$ and an alpha greater than 1 and less than 10; and
a cladding region comprising a first inner cladding region having an outer radius $r_2$ greater than 9 microns, less than 14 microns and refractive index $\Delta_2$ and a second outer cladding region surrounding the inner cladding region and comprising refractive index $\Delta_4$, wherein $\Delta_1 > \Delta_4 > \Delta_2$, and wherein the difference between $\Delta_4$ and $\Delta_2$ is greater than 0.002 percent.

14. The fiber of claim 13, wherein said fiber exhibits a MAC between 6.5 and 7.5.

15. The fiber of claim 13, wherein said fiber exhibits a wire mesh covered drum microbend loss at 1550 nm which is less than or equal to 0.07 dB/km.

16. The fiber of claim 13, wherein said fiber exhibits an attenuation at 1550 nm which is less than or equal to 0.186 dB/km.

17. The fiber of claim 13, wherein said fiber exhibits an attenuation at 1550 nm which is less than or equal to 0.184 dB/km.

18. The optical fiber of claim 13, wherein $r_1/r_2$ is less than 0.25.

19. The optical fiber of claim 1, wherein the core of said fiber exhibits an alpha greater than or equal to 1.0 and less than or equal to 10.

20. The optical fiber of claim 1, wherein the outer cladding region includes more than 200 ppm of chlorine higher than first inner cladding region.

21. The optical fiber of claim 1, wherein the outer cladding region includes more than 1200 ppm of chlorine higher than first inner cladding region.

22. The optical fiber of claim 13, wherein the first inner cladding region contains less than 0.02 wt % fluorine.

23. The optical fiber of claim 13, wherein the first inner cladding region is essentially free of fluorine and germania.

24. The optical fiber of claim 13, wherein $\Delta_4 > \Delta_2$ for a length extending from $r_2$ to a radius of at least 30 microns.

25. The optical fiber of claim 13, wherein the profile volume, $V_3$ of the outer cladding region, calculated between the outer radius of the first inner cladding region and a radial distance of 30 micron, is equal to:

$$V_3 = 2\int_{r2}^{r30} \Delta_{(4-2)}(r)rdr$$

and $|V_3|$ is at least 2.5% $\Delta$ micron$^2$.

26. An optical fiber comprising:
a central core region having outer radius $r_1$ and refractive index $\Delta_1$
a cladding region comprising a first inner cladding region having an outer radius $r_2 > 8$ microns and refractive index $\Delta_2$ and a second outer cladding region surrounding the inner cladding region and comprising refractive index $\Delta_4$, wherein $\Delta_1 > \Delta_4 > \Delta_2$, and wherein the core region comprises a super-Gaussian profile which at least substantially follows the equation % $\Delta(r) =$ % $\Delta_{1max} \cdot \mathrm{EXP}(-((r/a)^\gamma))$, where r is the radial distance from center of the fiber, a=radial scaling parameter corresponding to the radial location where % $\Delta = (\% \Delta_{1max}/e)$, e is the base of the natural logarithm, and $\gamma$ (gamma) is a positive number.

27. The optical fiber of claim 26, wherein a is greater than 4.5.

28. The optical fiber of claim 26, wherein said fiber exhibits a cable cutoff between 1000 and 1260 nm.

29. An optical fiber comprising:
a central core region having outer radius $r_1$ and refractive index $\Delta_1$
a cladding region comprising a first inner cladding region having an outer radius $r_2 > 8$ microns and refractive index $\Delta_2$, wherein $\Delta_1 > \Delta_2$, and wherein the core region comprises a super-Gaussian profile which at least substantially follows the equation % $\Delta(r) =$ % $\Delta_{1max} \cdot \mathrm{EXP}(-((r/a)^\gamma))$, where r is the radial distance from center of the fiber, a is a radial scaling parameter corresponding to the radial location where % $\Delta = (\% \Delta_{1max}/e)$ and wherein e is the base of the natural logarithm, and $\gamma$ (gamma) is a positive number.

30. The optical fiber of claim 29, wherein a is greater than 4.5.

31. The optical fiber of claim 30, wherein said fiber exhibits a cable cutoff between 1000 and 1260 nm.

* * * * *